2,882,812

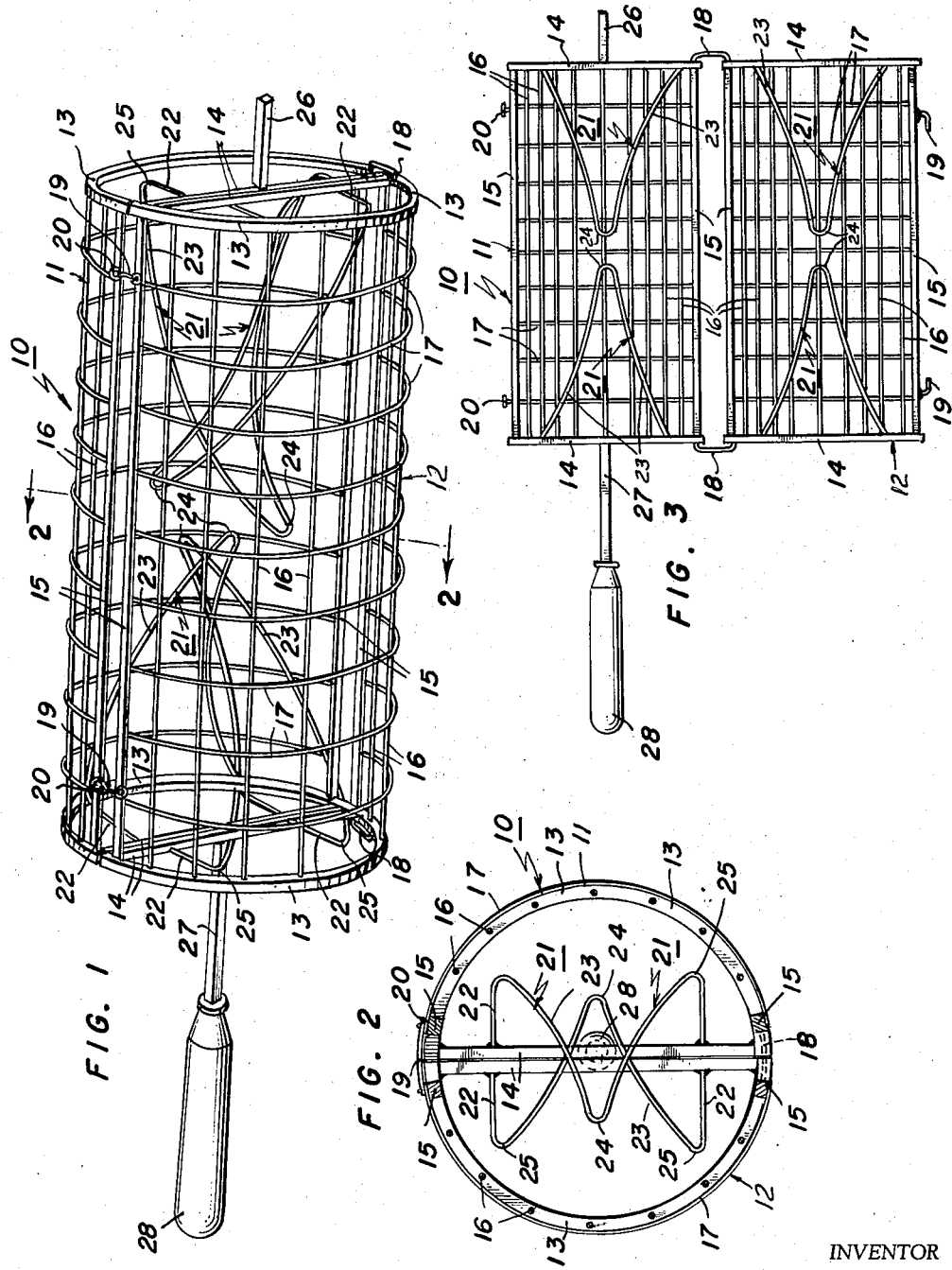

BASKET DEVICE FOR SUPPORTING AND CONFINING A ROAST OR THE LIKE IN A ROTISSERIE

Marvin J. Greenwald, Albuquerque, N. Mex.

Application May 7, 1958, Serial No. 733,557

2 Claims. (Cl. 99—427)

The present invention relates to cooking apparatus, and more particularly to a basket device for supporting and confining a roast or the like in a rotisserie.

An object of the invention is to provide a device of the above-mentioned character adapted for use upon a conventional rotisserie for cooking roasts and the like, and constructed so that roasts of various sizes or weight may be conveniently and efficiently cooked in a minimum of time, and without the necessity of tying the roasts with cord to confine them prior to cooking.

A further important object of the invention is to provide a basket device of the above-mentioned character which is adapted to support and confine during cooking either a single large roast or one or more small roasts, in the form of fowl, various cuts of beef, and the like.

A further object is to provide a device of the above-mentioned character which is highly simplified in construction, sturdy and durable, very economical to manufacture, easy to clean and maintain, and efficient in operation or use.

A further object is to provide a rotisserie basket of the above-mentioned character which is self-contained and free of parts or accessories which are separable and likely to become lost or misplaced.

Still another object is to provide a rotisserie basket including novel adjustable means for resiliently holding meat cuts or roasts of various sizes substantially centrally within the basket during cooking.

Other objects and advantages of the invention will become apparent during the course of the following description.

In the accompanying drawings forming a part of this application and in which like numerals are employed to designate like parts throughout the same, Figure 1 is a perspective view of a rotisserie basket embodying the present invention.

Figure 2 is a transverse section taken substantially on line 2—2 of Figure 1.

Figure 3 is a plan view on a reduced scale of the rotisserie basket in an open position.

In the drawings, wherein for the purpose of illustration is shown a preferred embodiment of the invention, the numeral 10 designates the rotisserie basket as a whole, which basket comprises a companion pair of elongated semi-cylindrical basket sections or halves 11 and 12, which are substantially identical in construction.

Each basket section 11 and 12 comprises a pair of end rigid frames, including semi-circular bars 13 and diametrically extending bars 14, rigidly secured between the ends of the semi-circular bars 13 by welding or the like. The rigid end frames of the basket sections 11 and 12 are rigidly connected in the case of each basket section by a pair of parallel longitudinal bars 15, having their opposite ends secured by welding or the like to the semi-circular bars 13 close to the diametrically extending bars 14. The longitudinal bars 15 and the diametrical bars 14 define the margins of the inner open sides of the semi-cylindrical basket sections 11 and 12, which open sides are brought together in opposed relation when the basket is in the closed cooking position shown in Figure 1.

Each basket section further comprises a plurality of circumferentially equidistantly spaced longitudinal wires 16, having their ends secured by welding or the like to the semi-circular bars 13 of the rigid end frames. The wires 16 are straight and parallel, and are preferably formed of relatively stiff or heavy wire.

Each basket section 11 and 12 further comprises a plurality of longitudinally equidistantly spaced semi-circular wires 17, preferably of lighter gauge than the wire 16, and crossing the wire 16 substantially at right angles thereto, and having their opposite ends secured by welding or the like to the longitudinal rigid bars 15 of the particular basket section 11 or 12. The semi-circular wires 17 may be free from positive connection to the longitudinal wire 16, or they may be welded or otherwise secured thereto at their points of crossing with the wire 16.

The several wires 16 and 17 and the semi-circular frame bars 13 thus form the semi-cylindrical open mesh side wall of each basket section 11 or 12. As shown in the drawings, the basket sections 11 and 12 have relatively large rectangular openings, formed by the crossing of the wires 16 and 17, which wires have relatively large spaces between them.

Corresponding sides or edges of the basket sections 11 and 12 are hingedly secured together, as best shown in Figure 3, by wire hinge elements 18, pivoted within openings provided in the rigid end frames of the basket sections, near one pair of the longitudinal bars 15.

In order to secure the companion basket sections 11 and 12 together in the closed or cooking position, a pair of hooks 19 are pivotally secured to the longitudinal bar 15 of basket section 12, on the side of the basket section remote from the hinges 18, and near and inwardly of the ends of the basket. Studs 20 are keepers for the hooks 19 are rigidly secured to the corresponding bar 15 of the other basket section 11, near and inwardly of the ends of the basket, so that the basket sections may be secured in opposed closed relation as shown in Figure 1.

Means are provided for partially closing the ends of the basket sections 11 and 12, and for supporting or confining and properly centering roasts of various sizes within the rotisserie basket. This means comprises, in the case of each basket section 11 or 12, a pair of generally longitudinal curved resilient wire spring devices shown generally at 21. Each spring device 21 comprises an outer pair of resilient supporting legs 22, formed straight and having their ends secured by welding or the like to the inner sides of the diametrically extending frame bars 14 of the particular basket section. The legs 22 are spaced inwardly of the ends of the bars 14 at each side of the basket section and extend substantially at right angles to the bars 14 as best shown in Figure 2. Consequently, the legs 22 serve to partially close or obstruct the otherwise open ends of the basket sections. The resilient devices 21 of each basket section further comprise elongated resilient wire body portions or loops 23, which taper toward the longitudinal center of the basket and which are curved longitudinally toward the opposite or companion basket section. The loops 23 have relatively narrow closed ends 24 which are spaced apart somewhat longitudinally on each basket section as best shown in Figure 3. The opposite sides of the curved and tapered loops 23 diverge outwardly toward the outer ends of the legs 22 and are integrally connected with the legs by curved or rounded portions 25. The resilient wire devices 21 of each basket section 11 or 12 extend fully away from the cylindrical side wall of the basket section and toward its open side and toward the opposite or companion basket section.

When the basket sections 11 and 12 are in the closed position of Figure 1, the narrow or tapered ends of the resilient wire devices 21 of the opposed basket sections overlap and interfit in the manner shown in Figures 1 and 2, when no roast or meat cut is within the rotisserie basket. The devices 21 are very resilient or springy, and will readily yield outwardly toward the cylindrical side walls of the basket sections, defined by the wires 16 and 17.

Rigidly secured by welding or the like to the diametrically extending bar 14 at one end of the basket section 11 is a square shaft 26 to be supported and driven by conventional mechanism of the rotisserie, in a well known manner. The shaft 26 extends axially of the rotisserie basket 10 when the same is closed, and the shaft 26 is arranged at the longitudinal center of the bar 14 carrying it. The corresponding bar 14 at the other end of the basket section 11 has a square shaft 27 rigidly secured to it in axial alignment with the shaft 26. The shaft 27 is also adapted to be supported and rotated by the conventional supporting and driving mechanism of the rotisserie. The shaft 27 may carry a heat-insulated handle extension 28, as shown.

In use, the basket sections 11 and 12 are opened as shown in Figure 3, and a single large roast, such as a roast of beef, leg of lamb, chicken or other fowl, or a plurality of smaller roasts may be placed within either semi-cylindrical basket section 11 or 12. The other basket section is now swung to the closed position over the basket section holding the roast or roasts, and the hooks 19 are engaged with the keepers 20 and the rotisserie basket is ready to be placed in the rotisserie for cooking the roast.

When the basket sections are closed, the spring devices 21 will readily yield outwardly toward parallelism with the cylindrical side wall of the rotisserie basket, and the devices 21 will exert a yielding confining or holding force upon the roast and also tend to center the roast inside of the rotisserie basket during the cooking operation. If two small roasts are to be cooked at once, instead of one larger roast, the interfitting and coacting pairs of resilient wire devices 21 at the opposite ends of the basket will then serve to hold, center and confine the two roasts within the basket. The presence of the resilient devices 21 renders it unnecessary to truss or tie the roasts with cord or the like, prior to placing them within the rotisserie basket. The devices 21 also serve to prevent a large roast or one or more smaller roasts from moving inside of the basket 10 while the same is rotating during the cooking operation.

It is thus seen that I have provided a highly simplified and substantially unitary rotisserie basket, free from separable parts likely to become lost, and constructed and arranged to support and confine a large roast or a plurality of smaller roasts within the basket without the use of ties or trusses upon the roast during cooking. I have found that the use of my rotisserie basket greatly simplifies the cooking procedure and saves a great deal of time in the cooking operation. The device is easy to clean with a brush and suitable detergent, and the construction is sturdy, light-weight and long lasting with reasonable care.

It is to be understood that the form of the invention herewith shown and described is to be taken as a preferred example of the same, and that various changes in the shape, size and arrangement of parts may be resorted to, without departing from the spirit of the invention of the scope of the sub-joined claims.

Having thus described my invention, I claim:

1. A rotisserie basket comprising a companion pair of hingedly connected substantially semi-cylindrical basket halves, each basket half having a pair of end substantially semi-circular rigid frame members and a pair of spaced longitudinal rigid frame members connecting the end frame members, spaced longitudinal wires extending between and connected with the end frame members of each basket half, spaced circumferentially extending wires secured to and crossing the longitudinal wires of each basket half and forming with the longitudinal wires an open mesh wire side wall for the basket half, means for detachably securing the basket halves together in opposed relation, means connected with one basket half for supporting the basket halves in a rotisserie, and a pair of longitudinally opposed resilient wire loops secured to the end rigid frame members of each basket half, each wire loop being curved longitudinally and normally extending fully away from the wire side wall of the basket half carrying the wire loop, each wire loop tapering longitudinally inwardly from the end frame member carrying it and having a relatively narrow closed inner end which is rounded, said end being normally freely disposed near the longitudinal center of the basket half carrying the particular wire loop and projecting somewhat laterally into the other basket half of the rotisserie basket, whereby said closed ends of corresponding wire loops of the companion pair of basket halves cross and interfit when the basket halves are in opposed closed relation, said wire loops adapted to yield outwardly toward the side walls of the basket halves and to receive and grip a roast for supporting and centering the same within the rotisserie basket.

2. A rotisserie basket comprising a companion pair of hingedly connected substantially semi-cylindrical basket halves having open mesh wire side walls and rigid frame means secured to and supporting said side walls, the basket halves being swingable to opposed positions for forming a substantially cylindrical rotisserie basket, means for detachably securing the basket halves in opposed closed relation, shaft means carried by the opposite ends of one basket half for supporting the rotisserie basket upon a rotisserie mechanism, and a pair of longitudinally opposed elongated resilient wire loops for each basket half, said loops being curved and extending fully away from the side wall of the basket half which carries the loops, said loops including sides which converge longitudinally toward the longitudinal center of the rotisserie basket and relatively narrow curved closed ends which terminate near the longitudinal center of the basket and generally centrally thereof, the outer ends of the sides of said loops provided with lateral extensions, said extensions directed inwardly from the side wall of the basket half carrying the loops and secured to the frame means of the basket half, the inner end portions of the wire loops of one basket half crossing and interfitting with the inner end portions of the wire loops of the other basket half when the basket halves are in opposed closed relation, all of said wire loops adapted to yield outwardly toward parallelism with the side walls of the basket halves and to grip a roast and to support the same centrally within the rotisserie basket.

References Cited in the file of this patent
UNITED STATES PATENTS

| 559,720 | Lacroix | May 5, 1896 |
| 2,514,281 | Hobbs | July 4, 1950 |